(12) United States Patent
Yoshida et al.

(10) Patent No.: US 7,310,203 B2
(45) Date of Patent: Dec. 18, 2007

(54) THIN FILM MAGNETIC HEAD HAVING MAGNETIC POLE EDGE LAYER FOR ACHIEVING BOTH IMPROVEMENT OF RECORDING MAGNETIC FIELD AND REDUCTION OF UNNECESSARY LEAKAGE MAGNETIC FIELD, AND METHOD OF MANUFACTURING SAME

(75) Inventors: Nobuo Yoshida, Odawara (JP); Ichiro Oodake, Odawara (JP); Moriaki Fuyama, Hitachi (JP); Kazue Kudo, Odawara (JP); Kimitoshi Etoh, Odawara (JP); Shigekazu Ohtomo, Sayama (JP); Hiroshi Fukui, Hitachi (JP)

(73) Assignee: Hitachi Global Storage Technologies Japan, Ltd., Odawara-shi (JP)

( * ) Notice: Subject to any disclaimer, the term of this patent is extended or adjusted under 35 U.S.C. 154(b) by 911 days.

(21) Appl. No.: 10/237,860

(22) Filed: Sep. 10, 2002

(65) Prior Publication Data

US 2003/0053251 A1    Mar. 20, 2003

(30) Foreign Application Priority Data

Sep. 11, 2001 (JP) ............................. 2001-274418
Aug. 2, 2002 (JP) ............................. 2002-225484

(51) Int. Cl.
*G11B 5/47* (2006.01)

(52) U.S. Cl. .................... 360/126; 29/603.15; 360/317

(58) Field of Classification Search ................. 360/126, 360/317; 29/603.15
See application file for complete search history.

(56) References Cited

U.S. PATENT DOCUMENTS

| 6,317,289 | B1 * | 11/2001 | Sasaki | 360/126 |
| 6,525,905 | B1 | 2/2003 | Sasaki | |
| 6,549,370 | B1 * | 4/2003 | Kamijima | 360/126 |
| 6,603,641 | B1 * | 8/2003 | Sasaki | 360/317 |
| 6,624,971 | B1 * | 9/2003 | Sasaki | 360/126 |
| 6,801,407 | B2 * | 10/2004 | Sasaki et al. | 360/317 |

FOREIGN PATENT DOCUMENTS

JP    A-2000-155906    6/2000

* cited by examiner

*Primary Examiner*—Angel Castro
*Assistant Examiner*—Christopher R. Magee
(74) *Attorney, Agent, or Firm*—Antonelli, Terry, Stout & Kraus, LLP.

(57) ABSTRACT

There is provided a thin film magnetic head, with letting a distance of a portion, where a width of a track portion in an upper magnetic pole changes, from a flying plane from a medium be Ly, and letting a distance of a portion, where a distance between right and left of a surface portion in a lower magnetic pole in a track width direction is wider than the width of the upper magnetic pole in the track width direction, from the flying plane from a medium be Tp, by creating a thin film magnetic head that is equipped with a recording head that has a relation of $Tp \leq Ly$, it becomes possible to reduce a needless leakage magnetic field in the track width direction with securing magnetic field strength.

21 Claims, 11 Drawing Sheets

THIN FILM MAGNETIC HEAD HAVING MAGNETIC POLE EDGE LAYER FOR ACHIEVING BOTH IMPROVEMENT OF RECORDING MAGNETIC FIELD AND REDUCTION OF UNNECESSARY LEAKAGE MAGNETIC FIELD, AND METHOD OF MANUFACTURING SAME

BACKGROUND OF THE INVENTION

The present invention relates to a thin film magnetic head used for a magnetic disk unit, and in particular, to an induction type thin film magnetic head as a recording head.

Recently, in magnetic heads used for magnetic disk units, high density and high efficiency of recording media have been pursued, and miniaturization and high accuracy in shape of the heads have been promoted.

In order to cope with these requirements, a thin film magnetic head is required to have a large magnetic field at a point of a magnetic pole that contributes to magnetic recording, and the narrowing and high accuracy of a track width. In order to solve this problem, various examinations have been performed, that is, high Bs material has been adopted for a magnetic pole edge so as to enlarge a magnetic field of a thin film magnetic head, and head structure has been improved so as to improve the accuracy of the track width. One structure of a thin film magnetic head by the prior art is shown in FIG. 6. In the magnetic head with the structure in FIG. 6, it is intended to decrease the influence of a step of a coil 9 and non-magnetic insulating film 10 to an upper magnetic edge layer 7 that defines the track width by separately forming a magnetic core in an upper portion from a gap 4 to achieve the narrowing and high accuracy of the track width.

Nevertheless, even in the thin film magnetic head with the structure shown in FIG. 6, it becomes difficult to accurately form the upper magnetic edge layer 7 and a lower magnetic edge layer 1 in predetermined track width.

In addition, as the narrowing of track width and the high coercivity of a medium has been advanced, a recording magnetic field that has been required for a recording head has become large.

In order to improve the recording magnetic field of a recording head, it is effective to bring a track width spreading position Ly of the upper magnetic edge layer 7, which is shown in FIG. 6 as 20, closer to the side of an ABS 30 as a flying surface. However, in this case, although the magnetic field is improved, there is a possibility that effect track width may become large since a leakage magnetic field toward the track width also becomes larger. In addition, there is a non-magnetic insulating film 13 that defines gap depth Gd as 40 in the head structure in FIG. 6, and this non-magnetic insulating film 13 has a step of about 1 μm or so. Since the upper magnetic edge layer 7 that defines the track width is formed on the non-magnetic insulating film 13, there is a possibility that the accuracy of the resist pattern that forms the upper magnetic edge layer 7 is deteriorated because of being affected by a resist film thickness distribution and halation as the track width becomes narrower.

The invention aims at providing a thin film magnetic head, which solves these difficulties and enables high-density record and reproduction, and a production method thereof, and, a magnetic disk unit using this thin film magnetic head.

SUMMARY OF THE INVENTION

In order to attain the above-described objects, the invention relates to a thin film magnetic head, which is equipped with a recording head that has an upper magnetic pole, and a lower magnetic pole facing the upper magnetic pole through a gap layer, and is mainly characterized in that a recording head has a portion, where the above-described upper magnetic pole and lower magnetic pole are at the same width, on a flying plane from a medium, that the above-described upper magnetic pole contacts with a gap film in a track portion and has a portion where the width of the above-described track portion changes in the direction from the flying plane from the medium to the inside of the head, and a distance of a portion, where the width of the above-described track portion in the above-described upper magnetic pole changes, from the flying plane from the medium is set to be Ly, that the above-described lower magnetic pole contacts with the gap film in the above-described track part and has a surface portion, which is approximately orthogonal to the gap film, in the right and left sides of the above-described track portion, the above-described surface portion which is approximately orthogonal to the gap film and changes in the track width direction from the flying plane from the medium to the inside of the above-described head, and has a portion where the distance between the right and left of the surface portion in the track width direction is wider than the width of the above-described upper magnetic pole in the track width direction, and that, with letting a distance of a portion, where a distance between the right and left of a surface portion in the above-described lower magnetic pole in the track width direction is wider than the width of the above-described upper magnetic pole in the track width direction, from the flying plane from the medium be Tp, the thin film magnetic head has relation of Tp≦Ly.

Here, the direction to the inside of a head means a direction approximately perpendicular to a track width direction, and a direction toward the depth of the magnetic head (a direction of the flying height of the head) in view of the flying plane from the medium.

Other objects, features and advantages of the invention will become apparent from the following description of the embodiments of the invention taken in conjunction with the accompanying drawings.

PREFERRED EMBODIMENTS OF THE INVENTION

Figure 6:
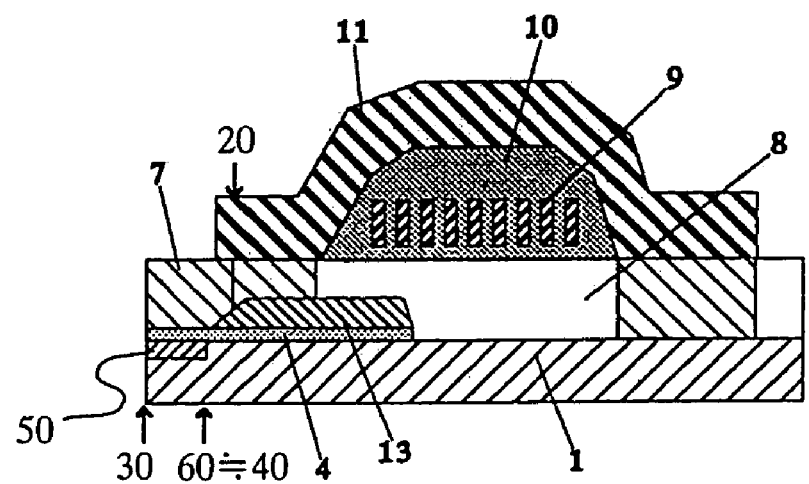
FIG. 6 is a sectional view of a head of a conventional example.
Figure 7:
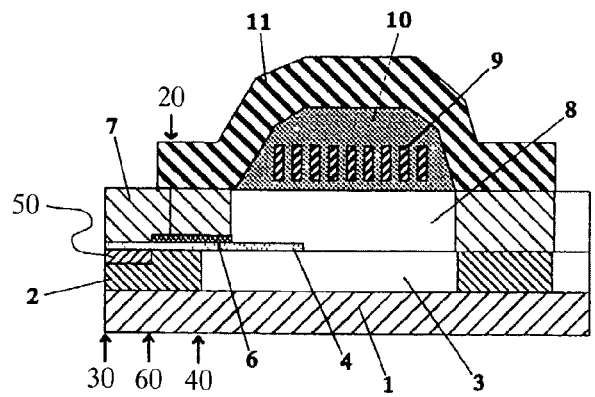
FIG. 7 is a sectional view of a head of the invention.

A first form of the inventions has a structure shown in FIG. 7, and an upper magnetic pole edge layer 7 is formed on a lower step surface in comparison with the structure shown in FIG. 6. In a magnetic head shown in FIG. 7, a gap depth is regulated by a position Gd of an edge portion of a lower magnetic pole edge layer 2, and its surface is planarized with a non-magnetic layer 3. A back gap film 6 that becomes a step at the time of forming the upper magnetic pole edge layer 7 is 0.2 µm thick at most. Heretofore, as shown in FIG. 6, though the upper magnetic pole edge layer 7 is formed on a high step of about 1 µm formed to regulate the position Gd, according to the present invention, it is possible to form the upper magnetic pole edge layer 7 on a low step of about 0.2 µm at most. Therefore, it becomes possible to improve the dimensional accuracy of a resist frame, used for forming the upper magnetic pole edge layer 7, in comparison with a conventional example.

Figure 1:
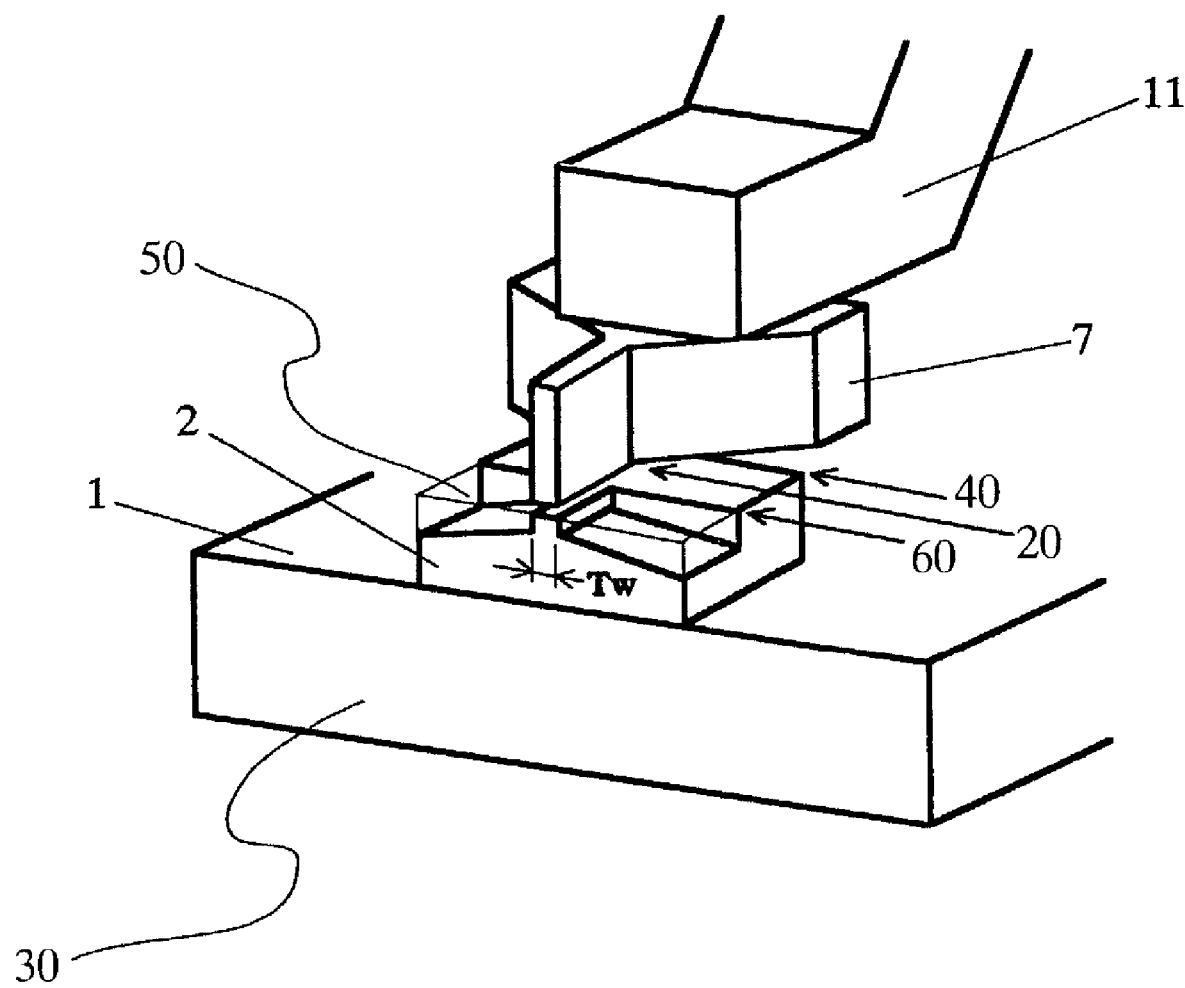
FIG. 1 is a schematic diagram of a thin film magnetic head of the invention.

Then, by letting Tp≦Ly with setting a distance of a trimming 50 from the flying plane from the medium (ABS) to be Tp as 60 in FIG. 1, and setting a distance of a portion, where the width of track portion in the upper magnetic pole edge layer 7 changes, from the flying plane from the medium to be Ly, it becomes possible to reduce a leakage magnetic field.

In addition, in the above-described thin film magnetic head, the gap film has a flying plane gap film exposed above the flying plane from the medium, and a back gap film provided behind the flying plane gap film. Furthermore, a distance of the back gap film from the flying plane from the medium is approximately the same as the distance Tp, and this flying plane gap film and the back gap film have different gap film structure from each other and at least any one of film chemical composition, film thickness, and a number of multilayer films differs. It is possible to adopt several head structures with the above-described structure.

For example, it is the structure of a thin film magnetic head having a lower magnetic pole having a lower magnetic core and a lower magnetic pole edge layer formed on the lower magnetic core, and an upper magnetic pole facing the lower pole through the gap film above the flying plane from the medium. Alternatively, it is the structure of a thin film magnetic head, where a lower magnetic pole has a lower magnetic core and a lower magnetic pole edge layer formed on the lower magnetic core, where an upper magnetic pole has an upper magnetic pole edge layer and an upper magnetic core that contacts with the upper magnetic pole edge layer inside the head, and where the upper magnetic pole edge layer faces the lower magnetic pole edge layer through the gap film on the flying plane from the medium. In addition, it is preferable that the irregularity of a gap side is 0.2 µm or smaller in the upper magnetic pole edge layer that defines track width.

In addition, a second form of the invention is a production method of a thin film magnetic head for forming an upper magnetic pole on the above-described low step surface. In this production method, a gap film is formed on a lower magnetic pole edge layer by any one of the following methods. There are three kinds of formation methods as follows:

1) A method of having the steps of forming a gap film after forming a lower magnetic pole edge layer, forming a pattern on a portion where gap film structure behind a flying plane changed, and forming a gap film different from the gap film after etching the above-described gap film with making the pattern a mask.

2) A method of having the steps of forming a flying plane gap film after forming a lower magnetic pole edge layer, and forming a back gap film on the flying plane gap film in a portion where gap film structure behind the flying plane is changed.

3) A method of having the steps of forming a back gap film after forming a lower magnetic pole edge layer in a portion, where back gap film structure behind the flying plane is changed, and thereafter forming a flying plane gap film on the lower magnetic pole edge layer and a back gap film.

It is possible to stably form the gap film that defines Tp by using any one of these gap formation methods. In addition, it becomes possible to decrease step height than the conventional by planarizing surfaces of a lower magnetic pole edge layer and a non-magnetic layer, which determine Gd, before gap formation.

This product is a magnetic read-write unit that includes a magnetic recording, medium, a motor driving the magnetic recording medium, a magnetic head performing record to and reproduction from the magnetic recording medium, and a mechanism positioning the magnetic head, the magnetic disk unit that is equipped with at least one thin film magnetic head that has the above-described recording head.

Alternatively, this product is a magnetic disk array apparatus that includes a plurality of magnetic disk units, the magnetic disk array apparatus that is equipped with at least one of the above-described magnetic disk units.

Well, one example of a thin film magnetic head according to the invention is shown in FIGS. 1, and 2A to 2E. FIG. 1 is a perspective view of a point of the thin film magnetic head, and FIGS. 2A to 2E are sectional views of the thin film magnetic head, shown in FIG. 1, at respective steps. Since the invention is a thin film magnetic head, the structure and description of a reproducing head formed on the same substrate are omitted.

Well, FIG. 1 shows a lower magnetic core 1, a lower magnetic pole edge layer 2, an upper magnetic pole edge layer 7, and an upper magnetic core 11. Though being omitted, a gap is formed between the lower magnetic pole edge layer 2 and upper magnetic pole edge layer 7. Let an edge position of the lower magnetic pole edge layer 2 in the depth direction from ABS that becomes a flying plane be Gd. In addition, let a position where track width Tw of the upper magnetic pole edge layer 7 changes be Ly. The lower magnetic pole edge layer 2 is etched (trimmed) with making the upper magnetic pole edge layer 7 and the gap a mask. Let this trimmed portion be Trim as 50. Though having almost the same width as the track width Tw of the upper magnetic pole edge layer 7 at ABS 30, in view of ABS 30, the track width Tw of the lower magnetic pole edge layer 2 spreads at an advanced position toward the depth (direction of the flying height of the head) in predetermined length. Let the position where the length of this lower magnetic pole edge layer in the track width direction changes be Tp.

Figure 12:
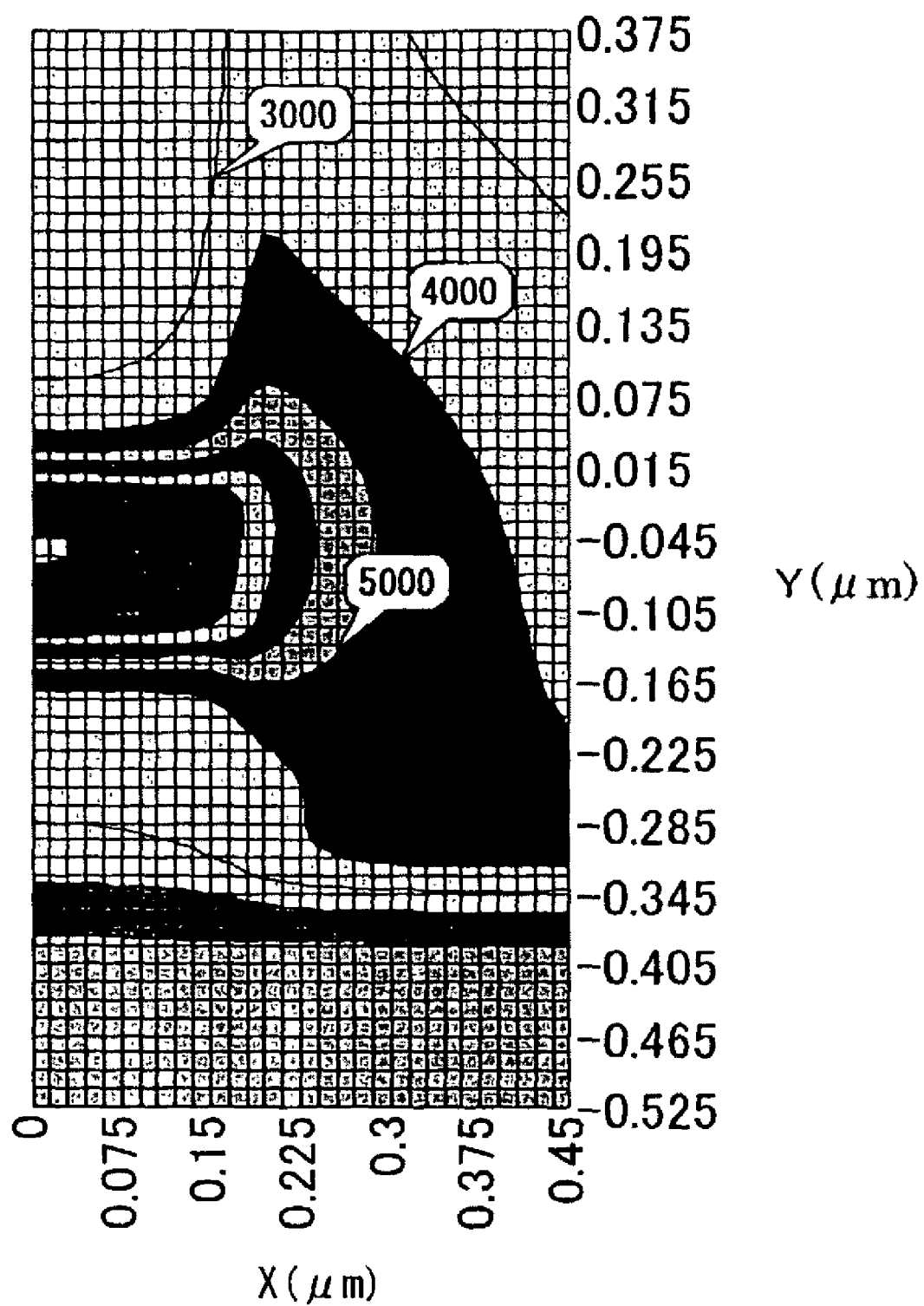
FIG. 12 is a characteristic graph showing the distribution of the magnetic field under the medium surface in the case of not adopting the invention.

In order to increase magnetic field strength, it is effective to bring the above-described Ly close to ABS. But, if the structure of the invention is not adopted, for example, if a shape of the Trim portion in FIG. 1 is similar to that of the upper magnetic pole edge layer 7, there is a possibility that a leakage magnetic field in the track width direction becomes large for effective track width to become large. An example of a magnetic field distribution (simulation) in the case where a shape of this Trim portion is the same as that of an upper magnetic pole and the invention is not adopted is shown in FIG. 12.

This shows a magnetic field component in the direction under a medium surface when viewing the head from the flying plane from the medium, and shows the right half from a track center of the head, X=0. The horizontal axis X is the position from the track center, X=0 to 0.175 μm denotes track width, and X=0.175 μm or more denotes an off-track portion. The vertical axis Y is the traveling direction of the medium, Y=−0.13 μm or less denotes a lower magnetic pole edge layer, Y=0 to −0.13 μm denotes a gap film, and Y=0 μm or more denotes an upper magnetic pole edge layer. As seen from this graph, the distribution of the magnetic field of 4000 (Oe) or more spreads to the position of 0.45 μm largely apart from the edge of a track.

Figure 8:
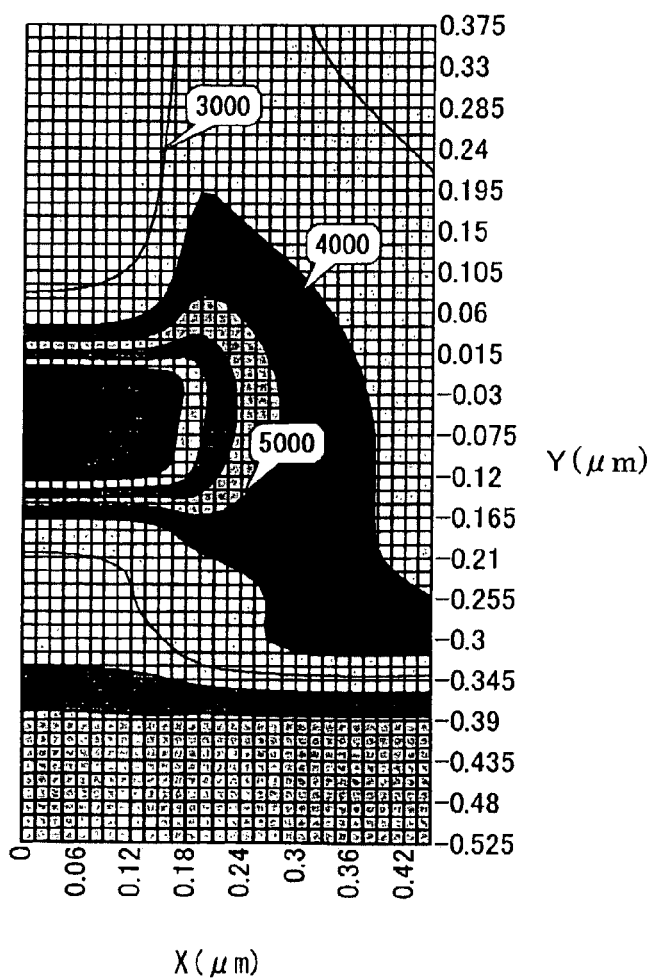
FIG. 8 is a characteristic graph showing a distribution of a magnetic field of a thin film magnetic head under a medium surface in Tp>Ly.
Figure 9:
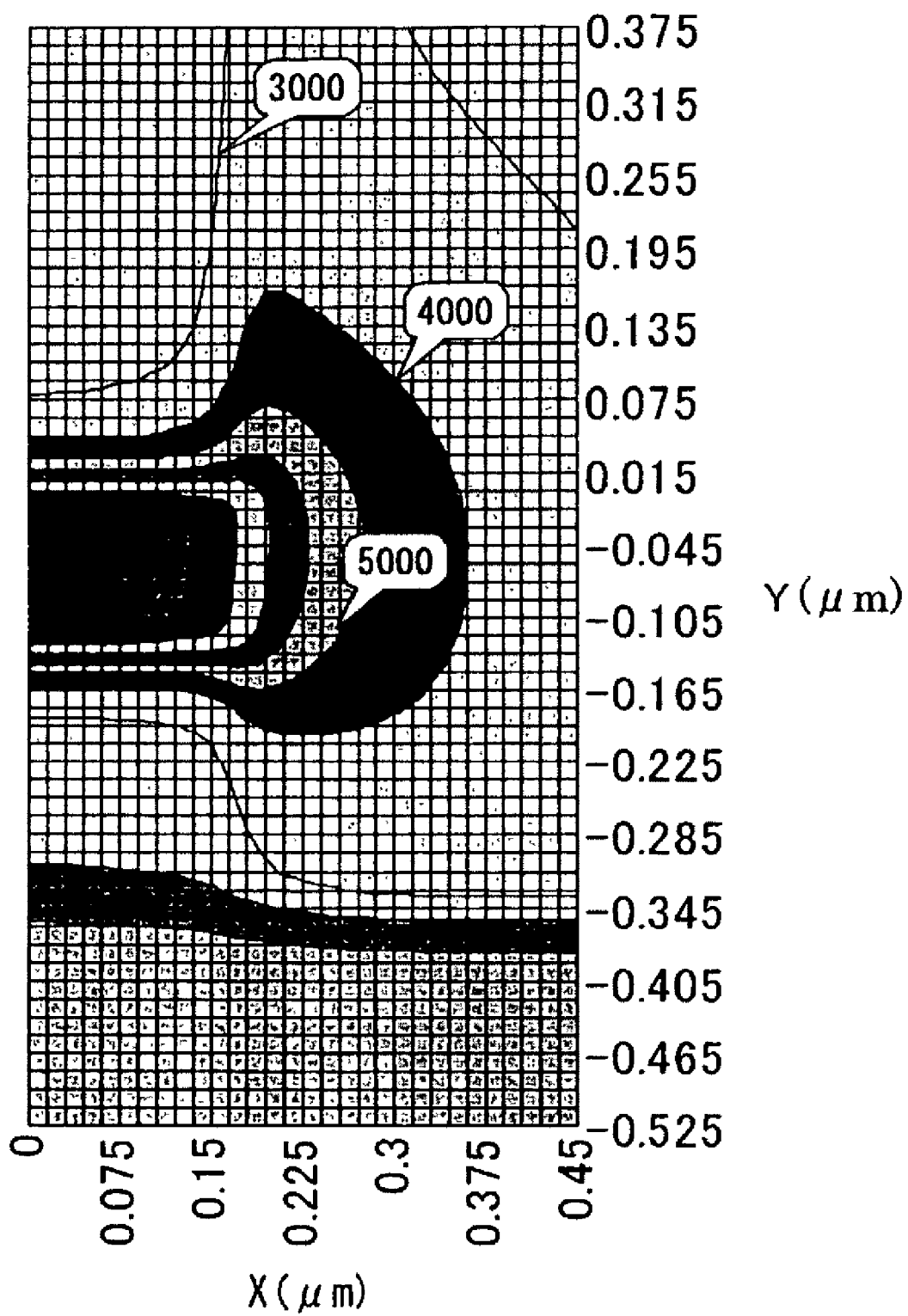
FIG. 9 is a characteristic graph showing the distribution of the magnetic field of the thin film magnetic head under a medium surface in Tp=Ly according to the invention.
Figure 10:
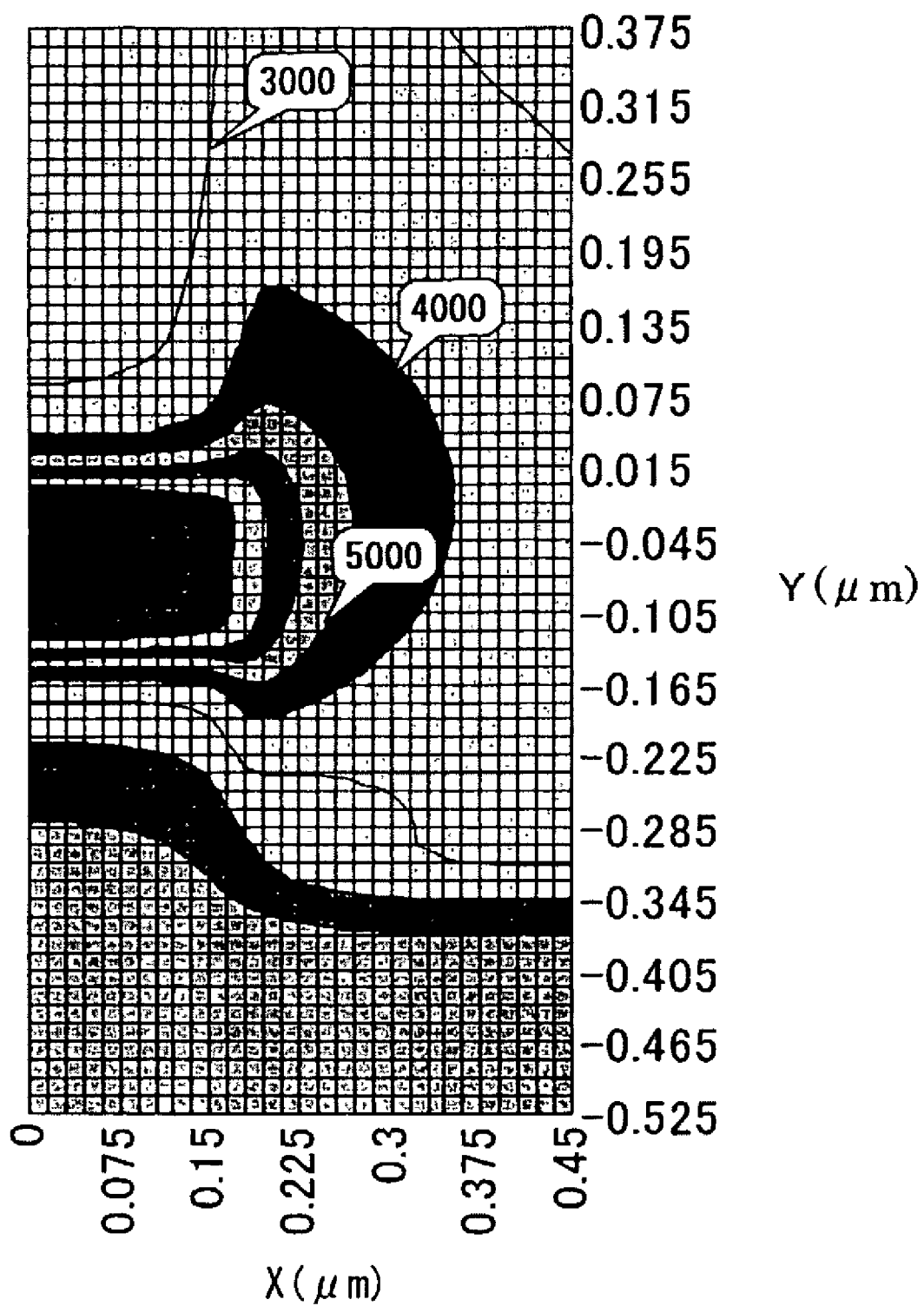
FIG. 10 is a characteristic graph showing the distribution of the magnetic field of the thin film magnetic head under a medium surface in Tp<Ly according to the invention.

What was obtained from the simulation was not only that it was possible to decrease this leakage magnetic field by the invention, but also that it was important to control the Tp position. This means that the structure of trimming only an ABS side from Ly is effective so as to effectively prevent the above-described leakage magnetic field. An example of this simulation result is shown in FIGS. 8 to 10.

These are magnetic field distributions in the cases where Gd=1.0 μm, track width (Tw)=0.35 μm, Ly=0.5 μm are fixed, and Tp is changed in such head structure that is an example of the present invention and is shown in FIG. 1. FIGS. 8 to 10 show respective distributions in the cases of Tp=0.75 μm, Tp=0.50 μm, and Tp=0.25 μm. Though the distribution of the magnetic field of 4000 to 5000 (Oe) spreads to the lower right similarly to FIG. 12 in Tp>Ly (FIG. 8), the magnetic field distribution is largely different in Tp=Ly (FIG. 9) and Tp<Ly (FIG. 10). Namely, since the distribution of the magnetic field of 4000 to 5000 (Oe) becomes small, the distribution is improved.

Here, the reason why the inventor paid attention to the distribution of the magnetic field of 4000 to 5000 (Oe) was that it was expected that an adverse effect would appear when half of the maximum magnetic field of about 10000 (Oe) in this calculation leaked since the coercive force of a medium was about a half of a recording magnetic field. The magnetic field distribution is improved by Tp≦Ly. It is considered that this cause is that, since an unnecessary leakage magnetic field component that arises because of the saturation of a magnetic field in the vicinity of Ly is absorbed in a non-trimmed portion of the lower magnetic pole edge layer that is a portion behind Tp, and a trimmed portion of the lower magnetic pole decreases so that the volume of the magnetic film near the gap increases than the conventional, magnetic saturation in this portion can be decreased.

Figure 13:
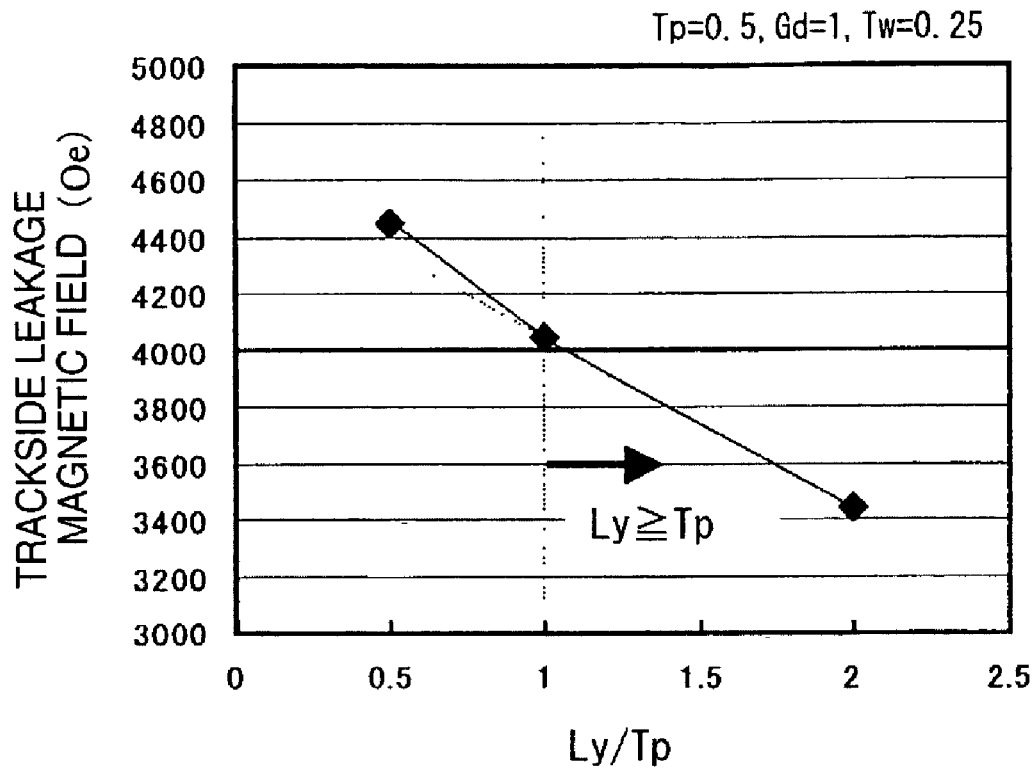
FIG. 13 is a characteristic graph showing a relation between the leakage magnetic field and Ly/Tp.

FIG. 13 shows an example of a leakage magnetic field in the trackside (simulation) at the time when Tp=0.5 μm, Gd=1.0 μm, and Tw=0.25 μm are fixed and Ly is changed in the structure according to the invention. In addition, the X-axis is shown in Ly/Tp. Furthermore, the value of the leakage magnetic field is that at a position that is 0.45 μm apart from the track center in the trackside direction. The reason why the leakage magnetic field at the position of 0.45 μm is used is that the leakage magnetic field distribution shown in FIG. 8 is in the vicinity of about 0.3 to 0.6 μm. As seen from FIG. 13, though being about 3500 to 4000 (Oe) until Ly/Tp is 1.0 to 2.0, the leakage magnetic field increases to 4500 (Oe) when Ly/Tp becomes 0.5. It can be observed that the inclination of the graph is also changed. From this, letting Tp≦Ly as shown in FIGS. 8 to 10 is important in the reduction of a leakage magnetic field.

Figure 11:
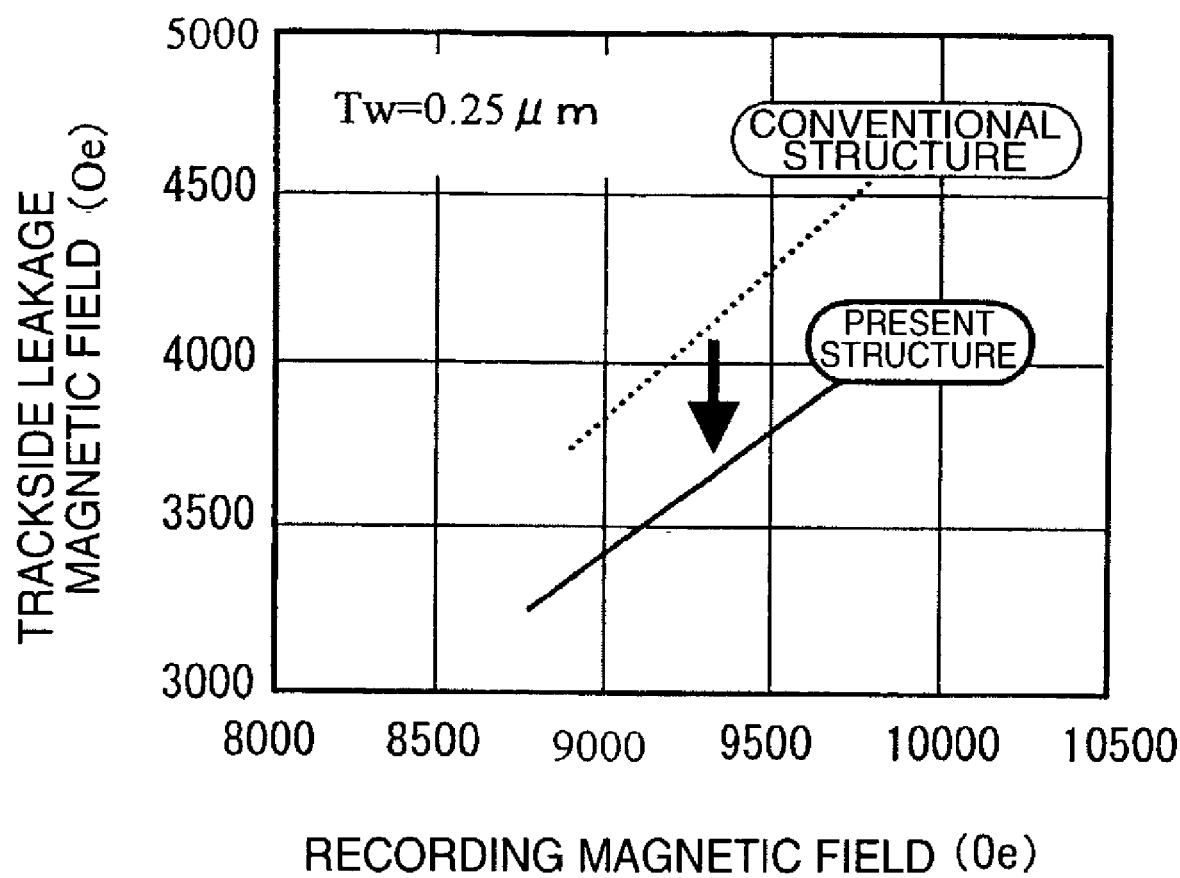
FIG. 11 is a characteristic graph showing a relation between a recording magnetic field and a leakage magnetic field in a conventional head and a head of the invention.

FIG. 11 shows respective recording magnetic fields and leakage magnetic fields (simulation) in the trackside direction in the case of the structure, in which the invention is not applied and which is explained in FIG. 12, and the case of the structure in which the invention is applied. In addition, this graph shows data in Tw=0.25 μm. As apparent from this FIG. 11, it is possible to make the improvement of a recording magnetic field and the reduction of a leakage magnetic field compatible by applying the structure of the invention. That is, as for the relation between the position of edge Tp of the trim and the position of Ly, it is important that Tp≦Ly holds. Owing to this structure, it becomes possible not only to improve the magnetic field strength by bringing Ly close to ABS, but also to reduce a needless leakage magnetic field in the track width direction.

Furthermore, when thinking about a high recording magnetic field in future, it is necessary to reduce Ly 20 for the improvement of the recording magnetic field. Moreover, for the reduction of a leakage magnetic field that is an effect of the invention, even if Ly 20 is reduced, it is necessary that Tp≦Ly holds. For example, in order to form the Trim portion and non-Trim portion under the relation of Ly=Tp, a prerequisite is Ly<Gd. For example, FIG. 9 described above corresponds to this. Even under the relation of Tp<Ly, so as to stably form the Trim portion and non-Trim portion, the relation of Ly<Gd is more preferable in view of the security of margins of alignment accuracy of the lower magnetic pole edge layer, gap, and upper magnetic pole edge layer, and the stability of the record magnetic characteristics.

For example, though Ly=0.5 μm, Tp=0.25 μm, and Gd=1.0 μm in FIG. 10, for example, so as to obtain the relation of Gd≦Ly by lessen this Gd, it is necessary to arrange Gd within 0.25 μm that is the distances between Tp and Ly, and hence, the margin of the alignment accuracy becomes ±0.125 μm. Since it is difficult to stably achieve this value, it seems that the stable production of the head becomes difficult. In addition, if Gd is lessened too much, magnetic saturation is caused in the lower magnetic pole edge layer, and hence, the reduction of a recording magnetic field is caused. From these facts, for the high recording magnetic field and reduction of a leakage magnetic field, it is preferable to have the relation of Tp≦Ly and Ly<Gd.

Figure 2A:
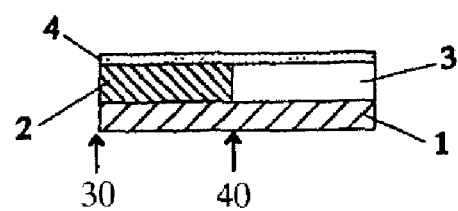
FIGS. 2A to 2E are sectional views in respective steps of the thin film magnetic head of the invention.

One example of the production method of a magnetic head that is shows in FIG. 1 is shown in FIGS. 2A to 2E. FIG. 2A shows a schematic diagram of a NiFe core of 2 μm thick formed as the lower magnetic core 1. A CoNiFe layer of 1.5 μm thick was formed on the lower magnetic core 1 as the lower magnetic pole edge layer 2, a first non-magnetic layer 3 was buried behind the CoNiFe layer (in the depth direction), and thereafter, planarization was performed. Here, an $Al_2O_3$ film was used as the first non-magnetic layer 3. Since Gd that defines gap depth is regulated by an edge of the lower magnetic pole edge layer 2, it becomes unnecessary to form the non-magnetic insulating film 13 again like a conventional example in FIG. 6.

In addition, Gd was formed at 1 μm here. After that, a 0.10 μm thick SiO$_2$ film was formed as the flying plane gap film 4. Though the SiO$_2$ film was used here as the flying plane gap film 4, it is also possible to use a non-magnetic insulating film made of AlN, Ta$_2$O$_5$, or Al$_2$O$_3$, or a non-magnetic metal film made of Cr, Ta, W, or Nb, or it is also possible to use these as a multilayer film. In addition, it is possible to set film thickness arbitrarily though the film thickness was made to be 0.1 μm here.

Figure 2B:
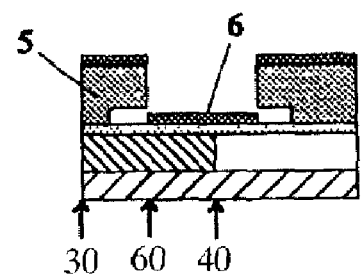

A liftoff pattern 5 was formed in FIG. 2B, and a 0.1-μm thick Al$_2$O$_3$ was deposited as a back gap film 6. Thereafter, since an unnecessary portion of the back gap film 6 was removed by peeling off the liftoff pattern 5, only the back gap film 6 on the flying plane gap film 4 remained. A position of the ABS 30 side of the back gap film 6 became Tp. The position (Tp) of the back gap film 6 was formed at 0.5 μm here. Though the Al$_2$O$_3$ film was used as the back gap film 6, it is also possible to use a non-magnetic insulating film made of AlN, Ta$_2$O$_5$, SiO$_2$, or C, or a non-magnetic metal film made of Cr, Ta, W, or Nb, or it is also possible to use these as a multilayer film.

In addition, it is possible to set film thickness arbitrarily though the film thickness was made to be 0.1 μm here. However, even if the film thickness of the back gap film 6 is thick, it is desirable that the thickness is about 0.15 to 0.20 μm. This is because the effectiveness of the invention is lost when the film thickness is thickened. The back gap film 6 that becomes a step at the time of forming the upper magnetic pole edge layer is 0.2 μm thick at most.

Heretofore, as shown in FIG. 6, though the upper magnetic pole edge layer is formed on a high step of about 1 μm formed to regulate the position Gd 40, according to the invention, it is possible to form the upper magnetic pole edge layer 7 on a low step of about 0.2 μm at most. Therefore, it becomes possible to realize narrow tracks by improving the dimensional accuracy of a resist frame, used for forming the upper magnetic pole edge layer 7, and resolution, in comparison with a conventional example. In addition, though the liftoff process was used for the pattern formation of the back gap film 6 here, it is also possible to use the process of forming the back gap film 6 on an entire surface, forming the resist mask in a portion where the back gap film 6 is left, and forming a pattern by etching the unnecessary back gap film 6 by using ion milling or reactive ion etching (RIE).

Figure 2C:
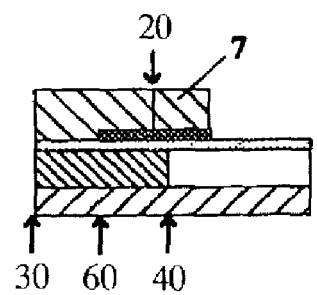

In FIG. 2C, a CoNiFe layer of 4 μm thick was formed on this by frame plating process as the upper magnetic pole edge layer 7 that regulates the track width Tw. In this process, an underplating film is formed, the resist frame is formed by photolithography, a magnetic film is plated by using this pattern, and the upper magnetic pole edge layer 7 is formed (not shown). What largely controls the track width accuracy is resist frame formation by the photolithography.

Since the conventional structure shown in FIG. 6 has the non-magnetic insulating film 13 of about 1 μm thick near ABS, halation and the distribution of resist film thickness becomes large when the resist frame is formed, and hence, there is a possibility of decreasing the accuracy of track width, the resolution of the resist film, etc.

In the invention, since the irregularity in the vicinity of ABS at the lower part of the upper magnetic pole edge layer 7 is only the back gap film 6 and the film thickness of the back gap film 6 is 0.1 μm that is a lower step than that in the conventional structure, it is possible to reduce the halation and the distribution of resist film thickness, and hence, it is possible to form the upper magnetic pole edge layer 7 in high accuracy. Though the 4 μm thick CoNiFe film was formed as the upper magnetic pole edge layer 7, it is also possible to adopt such film structure that Bs changes, for example, a 1.5 μm CoNiFe film that is high Bs material is formed in the gap side, and a 2.5 m NiFe film is formed thereon. In addition, the Ly position of the upper magnetic pole edge layer 7 was formed at 0.8 μm.

Figure 2D:
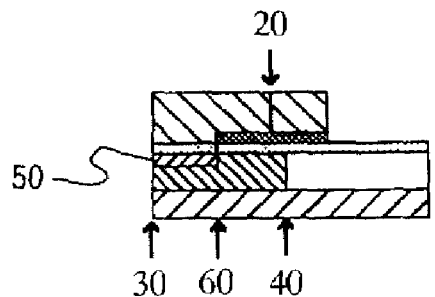

In FIG. 2D, first of all, the flying plane gap film 4 was etched by RIE by using a CF$_4$ gas with making the back gap film 6 a mask. Since Al$_2$O$_3$ of the back gap film 6 that is mask material is hardly etched by an F-based gas, Al$_2$O$_3$ functions effectively as the mask material. Though CF$_4$-RIE was used for the etching of the flying plane gap film 4 here, it is possible to arbitrarily set etching process according to the film structure of the back gap film 6. For example, it is also possible to use ion milling or Cl-based RIE. Next, with making the back gap film 6 and upper magnetic pole edge layer 7 a mask, the lower magnetic pole edge layer 2 was etched by the ion milling to form Trim. Since the Tp position is regulated by the position (Tp) of the back gap film 6 in the ABS side, it is possible to form the Trim position (Tp) at approximately the same position as the back gap. It is possible to use two layers of the back gap film 6 and flying plane gap film 4 as an etching mask that regulates Tp, and it is possible that they function enough as mask material.

Figure 2E:
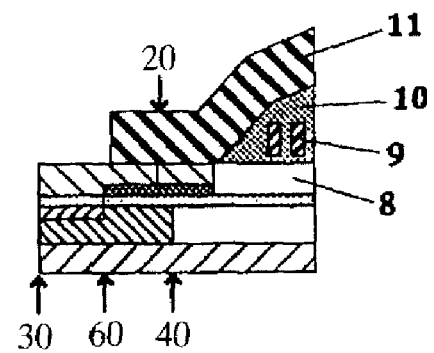
Figure 3A:
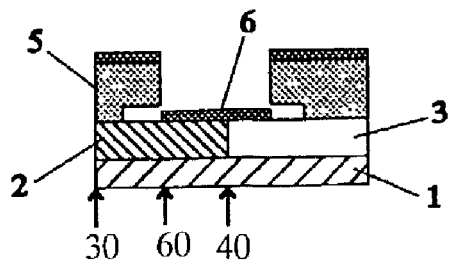
FIGS. 3A to 3E are sectional views in respective steps of a thin film magnetic head of another example of the invention.
Figure 3B:
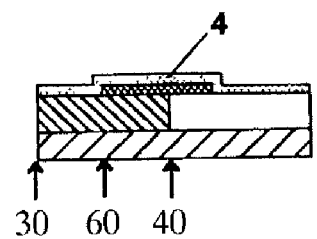
Figure 3C:
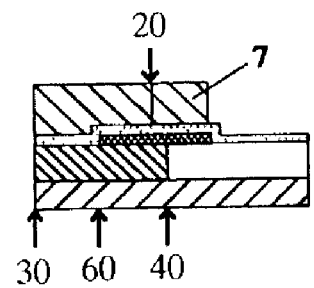
Figure 3D:
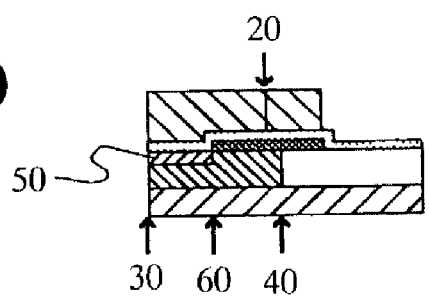
Figure 3E:
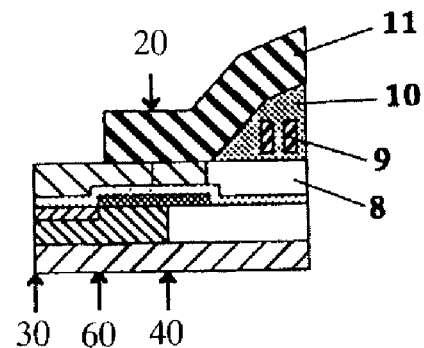

In FIG. 2E, after planarization by burying the upper magnetic pole edge layer 7 in the second non-magnetic layer (Al$_2$O$_3$ film) 8, a 2 μm thick Cu film was used and formed as the coil 9, a resist layer was used and formed as the non-magnetic insulating film 10, and a 2 μm thick NiFe film was formed as the upper magnetic core 11. Since having such process steps and structure, the thin film magnetic head in FIG. 1 can be stably formed.

FIGS. 3A to 3E are another example of the invention. This is different from the structure and the production method in FIGS. 2A to 2E, and after forming the back gap film 6, the flying plane gap film is formed. This method is effective in particular if the defective adhesion of the flying plane gap film 4 and liftoff pattern 5 etc. arise when the liftoff pattern 5 is formed on the flying plane gap film 4. Since it becomes possible to improve the adhesion of the liftoff pattern 5 by directly forming the liftoff pattern 5 on the lower magnetic pole edge layer 2 and Al$_2$O$_3$ film 3, it becomes possible to prevent the defective adhesion of the liftoff pattern 5. In addition, since the back gap film is formed beforehand, an etching damage to the flying plane gap film is not caused. Therefore, it is also possible to form the back gap film 6 by the etching process without using the liftoff process.

FIGS. 4A to 4E are still another example of the invention. This is different from the structure and production methods in FIGS. 2A to 3E, and aims at the reduction of a step of the back gap film and the further high accuracy of the upper magnetic pole edge layer 7.

Figure 4A:
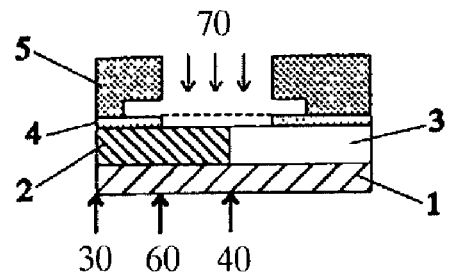
FIGS. 4A to 4E are sectional views in respective steps of a thin film magnetic head of still another example of the invention.

In FIG. 4A, after forming the flying plane gap film 4, the liftoff pattern 5 is formed. The flying plane gap film is etched by performing RIE or ion milling (IM) as designated by the reference numeral 70 in the same figure with making this liftoff pattern 5 an etching mask.

Figure 4B:
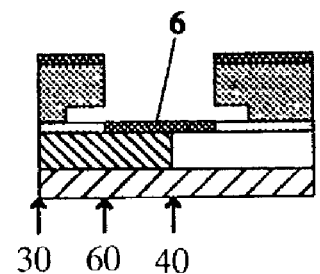

In FIG. 4B, the back gap film 6 is formed in the presence of the liftoff pattern 5. Then, since the back gap film 6 is formed in the portion where the flying plane gap film 4 was etched, a step caused by the film thickness of the back gap film only by the film thickness of the flying plane gap film 4 is absorbed. Therefore, since the step by the back gap film is decreased more than those in FIGS. 2A to 3E, it is possible to form the resist frame by the photolithography, which is formed on these gaps, in higher accuracy.

Figure 4C:
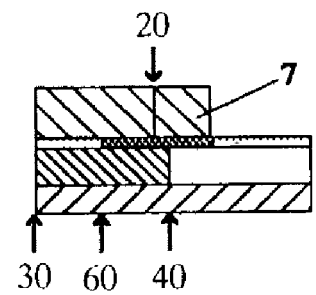
Figure 4D:
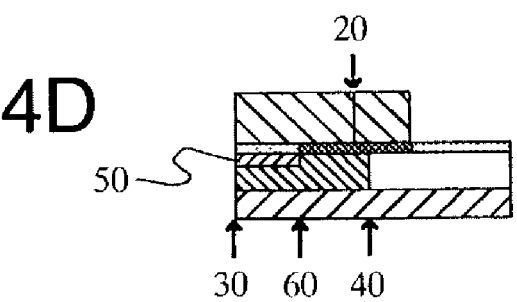
Figure 4E:
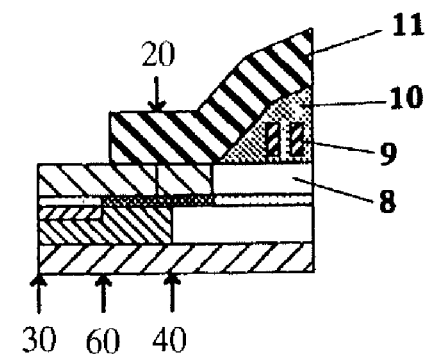

In FIGS. 4C to 4E, trimming is performed similarly to those in FIGS. 2A to 3E to form the structure up to the upper magnetic core 11. It is described that it is possible to apply the etching process for the formation of the back gap in FIGS. 2A to 3E. Similarly, also in the case shown in FIGS. 4A to 4E, it is also possible to use a method for performing the etching formation of the back gap on the back gap film by using the liftoff pattern as an etching mask. Thereafter, so long as the flying plane gap is formed on the liftoff pattern as it is and liftoff is performed, the following process step is the same as that in FIG. 4C.

Figure 5:
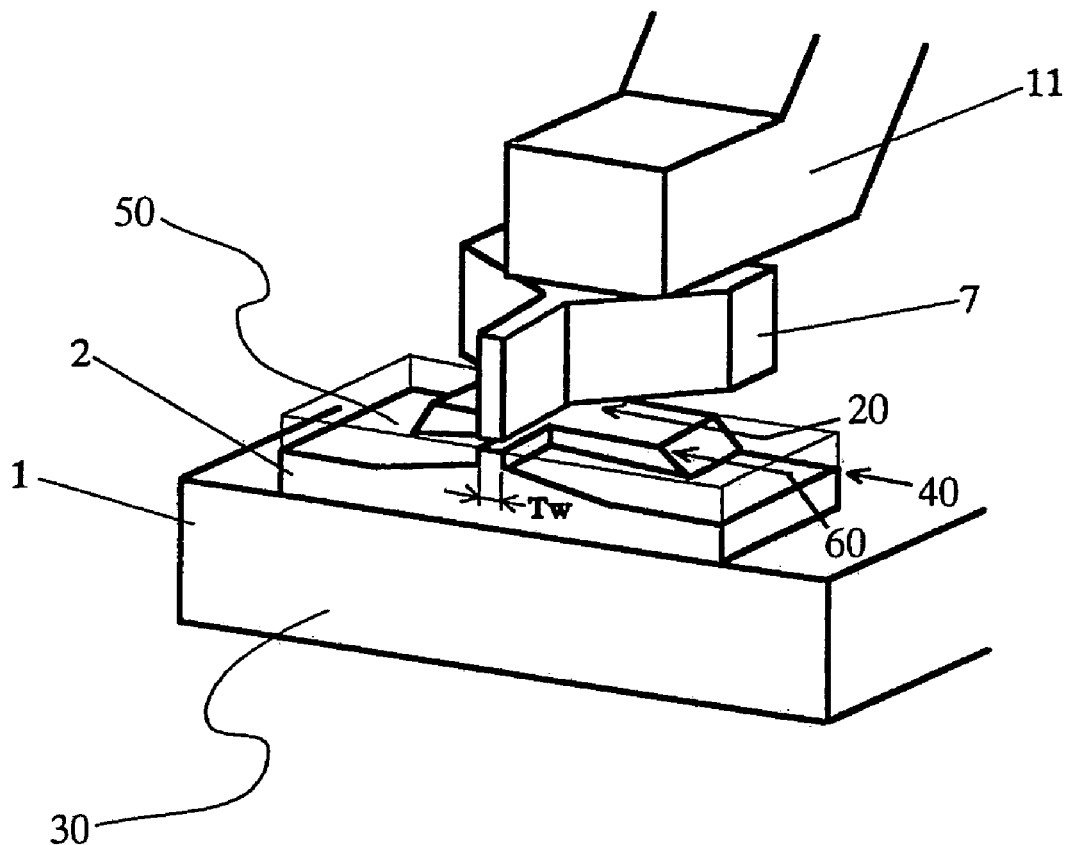
FIG. 5 is a schematic diagram of a thin film magnetic head of another example of the invention.

FIG. 5 is another example of the invention. A point different from the structure in FIG. 1 is a point that the lower magnetic pole edge layer 2 is made larger in the direction of Tw. As a result, it becomes possible to pass more magnetic fluxes from the lower magnetic pole 1 to the lower magnetic pole edge layer 2 and it becomes possible to relax the saturation of a magnetic field in the lower magnetic pole edge layer, and as a result, it becomes possible to pass the magnetic fluxes to the gap side more efficiently. In addition, since the lower magnetic pole edge layer 2 is expanded in the direction of Tw, it becomes possible to increase the margin of alignment in the direction of Tw with the lower magnetic pole edge layer 2 and upper magnetic pole edge layer 7.

An example of showing the head structure according to the invention to a backside of the head similarly to the conventional example in FIG. 6 is shown in FIG. 7. Though this is shown in the above description, the gap depth is defined at the position Gd of the edge of the lower magnetic pole edge layer 2, and its surface is planarized by the $Al_2O_3$ film 3. The back gap film 6 formed on this is 0.2 μm thick at most. Therefore, instead of a high step of about 1 μm shown in FIG. 6, it is possible to form the upper magnetic pole edge layer 7 on a low step of about 0.2 μm at most. Therefore, it becomes possible to improve the dimensional accuracy of a resist frame, used for forming the upper magnetic pole edge layer 7, in comparison with a conventional example.

Figure 14:
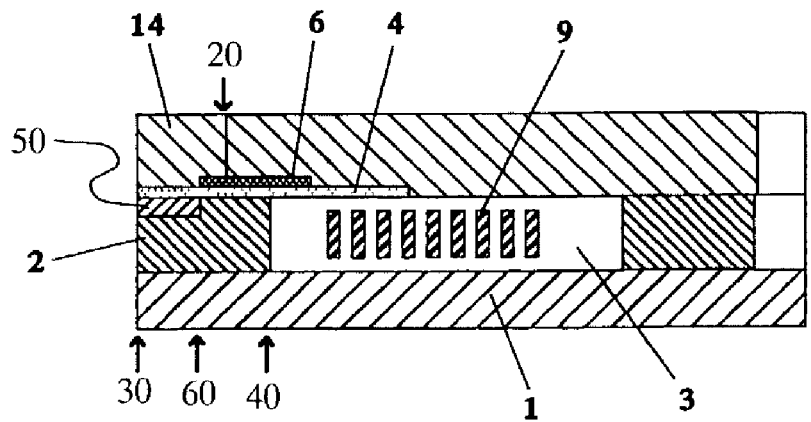
FIG. 14 is a sectional view of a head of another example of the invention.

FIG. 14 shows the head structure of another example of the invention. In the case of FIG. 7, the upper magnetic pole was formed by performing separation into the upper magnetic pole edge layer 7 and upper magnetic core 11. In the structure shown in FIG. 14, however, the upper magnetic pole 14 is formed by integrating the upper magnetic pole and upper magnetic core. This is the head structure whereby step reduction can be performed than the steps in FIG. 7, and also has the effects of the invention that are explained up to now.

As described above, by applying the thin film magnetic head of the invention, it becomes possible to make the accuracy of track width and magnetic field strength compatible even in narrow track width. When the head of the invention is used as a recording head and a reproducing head is separately combined, it becomes possible to use them as a read-write head. When a head of the invention is built in a magnetic disk unit, or when the magnetic disk units are further built in a magnetic disk array apparatus, it is possible to demonstrate excellent effects in either.

As described above, it is possible to provide a head which can reduce a needless leakage magnetic field in the track width direction with securing magnetic field strength by using a thin film magnetic head of the invention, and has the good accuracy of track width even in narrow track width by forming an upper magnetic pole edge layer on a step lower than the conventional. In addition, it is possible to provide a magnetic disk unit and a magnetic disk array apparatus that have excellent performance by installing each thin film magnetic head of the invention.

Further, the thin film magnetic head according to the invention may be mounted in a magnetic recording and reproducing unit comprising a magnetic recording medium, a motor driving the magnetic recording medium, a magnetic head performing record to and reproduction from the magnetic recording medium, and a mechanism positioning the magnetic head. Also, the magnetic recording and reproducing unit may be mounted in a magnetic disk array apparatus which is constructed by connecting a plurality of magnetic disk units.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A thin film magnetic head comprising:
   an upper magnetic pole; and
   a lower magnetic pole facing the upper magnetic pole through a gap layer, wherein
   when a track width direction is defined as an x-axis direction, a direction orthogonal to an air bearing surface (ABS) is defined as a y-axis direction, and a direction orthogonal to the x-axis direction and the y-axis direction is defined as a z-axis direction,
   the upper magnetic pole is configured so that a first upper pole portion which has a thickness of a track width Tw in the x-axis direction extends in the y-axis direction from the ABS to a height Ly, and a second upper pole portion has a width equal to or wider than Tw in the x-axis direction at a height equal to or higher than Ly in the y-axis direction,
   the lower magnetic pole is configured so that a first lower pole portion which has a thickness of the track width Tw in the x-axis direction extends in the y-axis direction from the ABS to a height Tp, and a second lower pole portion has a width equal to or wider than Tw in the x-axis direction at a height equal to or higher than Tp in the y-axis direction, said second lower pole portion having the width equal to or wider than Tw in the x-axis direction being formed up to a height Gd in the y-axis direction, said first lower pole portion having the thickness of the track width Tw in the x-axis direction being provided up to a predetermined height in a direction opposite to said upper magnetic pole from a portion contacting with said gap layer, and being configured to have a width equal to or wider than Tw in the x-axis direction at a height equal to or higher than said predetermined height, and
   the thin film magnetic head has a relationship of Tp≦Ly
   wherein a gap film has a flying plane gap film exposed above a flying plane from a medium, and a back gap film provided behind the flying plane gap film; and
   a distance of the back gap film from the flying plane from the medium is approximately the same as the Tp.

2. The thin film magnetic head according to claim 1, wherein the flying plane gap film and the back gap film have different gap film structure from each other; and at least any one of a film chemical composition, film thickness, and a number of multi-layer films differs.

3. The thin film magnetic head according to claim 1, wherein the lower magnetic pole has a lower magnetic core and a lower magnetic pole edge layer; and the lower magnetic pole edge layer faces the upper magnetic pole through a gap film.

4. The thin film magnetic head according to claim 3, wherein the upper magnetic pole has an upper magnetic core and an upper magnetic edge layer; and, the lower magnetic pole edge layer faces the upper magnetic pole edge layer through the gap film.

5. The thin film magnetic head according to claim 1, comprising a reproducing head that has a magneto-resistive element.

6. A thin film magnetic head comprising:
an upper magnetic pole; and
a lower magnetic pole facing the upper magnetic pole through a gap layer, wherein
when a track width direction is defined as an x-axis direction, a direction orthogonal to an air bearing surface (ABS) is defined as a y-axis direction, and a direction orthogonal to the x-axis direction and the y-axis direction is defined as a z-axis direction,
the upper magnetic pole is configured so that a first upper pole portion which has a thickness of a track width Tw in the x-axis direction extends in the y-axis direction from the ABS to a height Ly, and a second upper pole portion has a width wider than Tw in the x-axis direction at a height higher than Ly in the y-axis direction,
the lower magnetic pole is configured so that a first lower pole portion which has a thickness of the track width Tw in the x-axis direction extends in the y-axis direction from the ABS to a height Tp, and a second lower pole portion has a width wider than Tw in the x-axis direction at a height higher than Tp in the y-axis direction, said second lower pole portion having the width wider than Tw in the x-axis direction being formed up to a height Gd in the y-axis direction, said first lower pole portion having the thickness of the track width Tw in the x-axis direction being provided up to a predetermined height in a direction opposite to said upper magnetic pole from a portion contacting with said gap layer, and being configured to have a width wider than Tw in the x-axis direction at a height higher than said predetermined height, and
the thin film magnetic head has a relationship of $Tp \leq Ly$
wherein a gap film has a flying plane gap film exposed above a flying plane from a medium, and a back gap film provided behind the flying plane gap film; and
a distance of the back gap film from the flying plane from the medium is approximately the same as the Tp.

7. The thin film magnetic head according to claim 6, wherein the flying plane gap film and the back gap film have different gap film structure from each other; and at least any one of a film chemical composition, film thickness, and a number of multi-layer films differs.

8. The thin film magnetic head according to claim 6, wherein the lower magnetic pole has a lower magnetic core and a lower magnetic pole edge layer; and the lower magnetic pole edge layer faces the upper magnetic pole through a gap film.

9. The thin film magnetic head according to claim 8, wherein the upper magnetic pole has an upper magnetic core and an upper magnetic edge layer; and, the lower magnetic pole edge layer faces the upper magnetic pole edge layer through the gap film.

10. The thin film magnetic head according to claim 6, comprising a reproducing head that has a magneto-resistive element.

11. A thin film magnetic head comprising:
an upper magnetic pole; and
a lower magnetic pole facing the upper magnetic pole through a gap layer, wherein
when a track width direction is defined as an x-axis direction, a direction orthogonal to an air bearing surface (ABS) is defined as a y-axis direction, and a direction orthogonal to the x-axis direction and the y-axis direction is defined as a z-axis direction,
the upper magnetic pole is configured so that a first upper pole portion which has a thickness of a track width Tw in the x-axis direction extends in the y-axis direction from the ABS to a height Ly, and a second upper pole portion has a width widening from Tw in the x-axis direction at a height higher than Ly in the y-axis direction,
the lower magnetic pole is configured so that a first lower pole portion which has a thickness of the track width Tw in the x-axis direction extends in the y-axis direction from the ABS to a height Tp, and a second lower pole portion has a width wider than Tw in the x-axis direction at a height higher than Tp in the y-axis direction, said second lower pole portion having the width wider than Tw in the x-axis direction being formed up to a height Gd in the y-axis direction, said first lower pole portion having the thickness of the track width Tw in the x-axis direction being provided up to a predetermined height in a direction opposite to said upper magnetic pole from a portion contacting with said gap layer, and being configured to have a width widening from Tw in the x-axis direction at a height higher than said predetermined height, and
the thin film magnetic head has a relationship of $Tp \leq Ly$
wherein a gap film has a flying plane gap film exposed above a flying plane from a medium, and a back gap film provided behind the flying plane gap film; and
a distance of the back gap film from the flying plane from the medium is approximately the same as the Tp.

12. The thin film magnetic head according to claim 11, wherein the flying plane gap film and the back gap film have different gap film structure from each other; and at least any one of a film chemical composition, film thickness, and a number of multi-layer films differs.

13. The thin film magnetic head according to claim 11, wherein the lower magnetic pole has a lower magnetic core and a lower magnetic pole edge layer; and the lower magnetic pole edge layer faces the upper magnetic pole through a gap film.

14. The thin film magnetic head according to claim 13, wherein the upper magnetic pole has an upper magnetic core and an upper magnetic edge layer; and, the lower magnetic pole edge layer faces the upper magnetic pole edge layer through the gap film.

15. The thin film magnetic head according to claim 11, comprising a reproducing head that has a magneto-resistive element.

16. The thin film magnetic head according to claim 1, wherein the back gap film is thicker than the flying plane gap film.

17. The thin film magnetic head according to claim 6, wherein the back gap film is thicker than the flying gap film.

18. The thin film magnetic head according to claim 11, wherein the back gap film is thicker than the flying plane gap film.

19. The thin film magnetic head according to claim 1, wherein the thin film magnetic head has a relationship of Tp≦Ly<Gd.

20. The thin film magnetic head according to claim 6, wherein the thin film magnetic head has a relationship of Tp≦Ly<Gd.

21. The thin film magnetic head according to claim 11, wherein the thin film magnetic head has a relationship of Tp≦Ly<Gd.

* * * * *